(12) United States Patent
Geppert et al.

(10) Patent No.: US 11,274,771 B2
(45) Date of Patent: Mar. 15, 2022

(54) CLAMP WITH CLAMP BAND AND RUBBER PROFILE

(71) Applicant: NORMA Germany GmbH, Maintal (DE)

(72) Inventors: Helmut Geppert, Karlstein (DE); Frank Schmidt, Langenselbold (DE); Gerrit von Breitenbach, Karlstein (DE); Daniel Kintea, Frankfurt am Main (DE); Michael Lenz, Schöneck (DE); Natan Lantsmann, Fulda (DE)

(73) Assignee: Norma Germany GmbH, Maintal (DE)

( * ) Notice: Subject to any disclaimer, the term of this patent is extended or adjusted under 35 U.S.C. 154(b) by 0 days.

(21) Appl. No.: 16/485,212

(22) PCT Filed: Jan. 31, 2018

(86) PCT No.: PCT/EP2018/052402
§ 371 (c)(1),
(2) Date: Aug. 12, 2019

(87) PCT Pub. No.: WO2018/149646
PCT Pub. Date: Aug. 23, 2018

(65) Prior Publication Data
US 2020/0041040 A1 Feb. 6, 2020

(30) Foreign Application Priority Data
Feb. 15, 2017 (DE) .......................... 102017103079.4

(51) Int. Cl.
*F16L 55/035* (2006.01)
*F16L 3/123* (2006.01)
(Continued)

(52) U.S. Cl.
CPC ............... *F16L 3/1233* (2013.01); *F16L 3/00* (2013.01); *F16L 3/08* (2013.01); *F16L 3/12* (2013.01); *F16L 3/14* (2013.01); *F16L 55/035* (2013.01)

(58) Field of Classification Search
CPC ....... F16L 3/1233; F16L 3/123; F16L 3/1211; F16L 3/1222; F16L 3/1236; F16L 3/14; (Continued)

(56) References Cited

U.S. PATENT DOCUMENTS 2,250,280 A * 7/1941 Starbird ................. H01R 4/643
439/426
2,338,006 A * 12/1943 Morehouse ........... F16L 3/1233
248/74.3
(Continued)

FOREIGN PATENT DOCUMENTS

| CN | 201688034 U | 12/2010 |
|---|---|---|
| CN | 204271555 U | 4/2015 |

(Continued)

OTHER PUBLICATIONS

Chinese Office Action for Chinese Application No. 201880007422.8 dated May 27, 2020 (7 pages).
(Continued)

*Primary Examiner* — Nkeisha Smith
(74) *Attorney, Agent, or Firm* — Reising Ethington, P.C.

(57) ABSTRACT

A clamp for fastening an object in the form of a tube or hose, having an elongate clamp strap at each of the ends of which there is provided a radially outwardly projecting fastening leg, and having a rubber profile which is provided on the radial inner face of the clamp strap and which at least partially engages around each of the edges of the clamp strap by way of a lip. At least one first holding geometry is provided on the radial inner face of the clamp strap, and at
(Continued)

least one second holding geometry is provided on the radial outer face of the rubber profile.

7 Claims, 2 Drawing Sheets

(51) Int. Cl.
  *F16L 3/14* (2006.01)
  *F16L 3/08* (2006.01)
  *F16L 3/12* (2006.01)
  *F16L 3/00* (2006.01)
(58) Field of Classification Search
  CPC ......... F16L 3/12; F16L 3/1203; F16L 3/1207; F16L 3/1033; F16L 3/1041; F16L 3/105; F16L 3/08; F16L 3/00; F16L 3/01
  USPC ......... 248/63, 62, 75, 76, 65, 58, 74.1, 74.2, 248/74.3, 74.4
  See application file for complete search history.

(56) References Cited

U.S. PATENT DOCUMENTS

| | | | | |
|---|---|---|---|---|
| 2,355,742 | A * | 8/1944 | Morehouse | F16L 3/2235 248/68.1 |
| 2,396,925 | A * | 3/1946 | Morehouse | F16L 3/223 248/68.1 |
| 2,427,770 | A * | 9/1947 | Herman | F16L 3/1233 248/74.3 |
| 2,455,598 | A * | 12/1948 | Michalenko | A47H 1/02 248/74.3 |
| 2,683,578 | A * | 7/1954 | Challenor | H01B 17/306 248/68.1 |
| 3,061,253 | A * | 10/1962 | Keaton | F16L 55/035 248/74.1 |
| 3,376,004 | A * | 4/1968 | Goldman | F16L 3/123 248/74.3 |
| 4,189,807 | A * | 2/1980 | Byerly | F16L 3/1233 174/40 CC |
| 4,338,707 | A * | 7/1982 | Byerly | F16L 3/1008 24/20 LS |
| 4,460,139 | A * | 7/1984 | Boehen | F16L 3/1233 248/68.1 |
| 5,261,633 | A * | 11/1993 | Mastro | F16L 3/18 248/68.1 |
| 5,384,936 | A * | 1/1995 | Van Walraven | F16L 3/12 24/279 |
| 5,435,506 | A * | 7/1995 | Wiley | F16L 3/10 248/74.1 |
| 5,742,982 | A * | 4/1998 | Dodd | F16G 11/00 24/16 R |
| 6,732,982 | B1 * | 5/2004 | Messinger | F16L 3/1233 24/16 PB |
| 7,392,569 | B2 * | 7/2008 | Sharkey | F16L 3/1025 24/16 R |
| 7,546,986 | B2 * | 6/2009 | Kim | F16L 3/1008 248/62 |
| 7,770,848 | B2 * | 8/2010 | Johnson | F16L 55/035 248/65 |
| 8,020,814 | B2 * | 9/2011 | Geppert | F16L 3/1233 248/74.3 |
| 8,074,945 | B2 * | 12/2011 | Schoenau | F16L 3/222 248/74.4 |
| 8,235,332 | B2 * | 8/2012 | Cesarino | F16L 3/1233 248/74.5 |
| 8,282,048 | B2 * | 10/2012 | Nguyen | F16L 3/1083 248/74.3 |
| 8,439,317 | B2 * | 5/2013 | Sampson | F16B 2/10 248/74.4 |
| 8,985,533 | B2 * | 3/2015 | Edmond | F16L 3/1222 248/68.1 |
| 9,133,963 | B2 * | 9/2015 | Geppert | F16L 3/1233 |
| 9,212,764 | B2 * | 12/2015 | Marche | F16L 3/1075 |
| 9,482,369 | B2 * | 11/2016 | Sampson | F16L 3/1058 |
| 10,274,109 | B2 * | 4/2019 | Kozan | F16L 55/035 |
| 10,487,862 | B2 * | 11/2019 | Geppert | F16B 2/065 |
| 10,668,878 | B1 * | 6/2020 | Sampson | F16L 55/035 |
| 10,800,540 | B2 * | 10/2020 | Gilbertson | F16L 3/2235 |
| 2009/0031538 | A1 * | 2/2009 | Reichel | F16L 3/123 24/16 PB |
| 2009/0140106 | A1 | 6/2009 | Johnson et al. | |
| 2012/0181413 | A1 * | 7/2012 | Steinhorst | F16L 59/135 248/636 |
| 2015/0337990 | A1 * | 11/2015 | Malaspina | F16L 3/123 248/74.3 |

FOREIGN PATENT DOCUMENTS

| | | |
|---|---|---|
| CN | 205136829 U | 4/2016 |
| DE | 4103701 C1 | 6/1992 |
| DE | 4200265 A1 | 7/1992 |
| DE | 102006020407 B3 | 1/2008 |
| DE | 102007055906 A1 | 6/2009 |
| DE | 102008012823 A1 | 9/2009 |
| DE | 102008036386 A1 | 2/2010 |
| DE | 102008036386 B4 | 3/2012 |
| EP | 0387966 A1 | 9/1990 |
| EP | 0884518 A1 | 12/1998 |
| EP | 2370215 B1 | 1/2015 |
| GB | 2465682 A | 6/2010 |
| JP | H02140084 U | 11/1990 |
| JP | 2011007256 A | 1/2011 |
| JP | 2013108522 A | 6/2013 |

OTHER PUBLICATIONS

English Translation of Chinese Office Action for Chinese Application No. 201880007422.8 dated May 27, 2020 (7 pages).
Japanese Office Action for Japanese Application No. 2019-563669 dated Jul. 14, 2020 (6 pages).
English Translation of Japanese Office Action for Japanese Application No. 2019-563669 dated Jul. 14, 2020 (9 pages).
German Office Action for German Application No. 102017103079.4 dated Sep. 4, 2020 (8 pages).
International Search Report for Application No. PCT/EP2018/052402 dated May 17, 2018 (3 pages).
English Translation of International Search Report for Application No. PCT/EP2018/052402 dated May 17, 2018 (2 pages).
German Office Action for Application No. 102017103079.4 dated Sep. 14, 2018 (7 pages).
Second Chinese Office Action for Chinese Application No. 201880007422.8 dated Jan. 12, 2021 (11 pages).
Japanese Office Action for Japanese Application No. 2019-563669 dated Feb. 24, 2021 (5 pages).
English Translation of Japanese Office Action for Japanese Application No. 2019-563669 dated Feb. 24, 2021 (7 pages).

* cited by examiner

CLAMP WITH CLAMP BAND AND RUBBER PROFILE

INTRODUCTION

The disclosure relates to a clamp for securing a tubular or hose-like object.

Clamps of the type mentioned in the introduction are generally used to fix or maintain pipes, hoses or cables on a mounted component. The clamp band is laid around the pipe or hose which is intended to be secured and the securing members are secured to the mounted component, whereby there is formed a receiving space which is closed in a peripheral direction and in which the pipe or the hose is retained. For example, the securing members are tensioned with respect to each other so that the pipe or the hose is clamped in the receiving space. The rubber profile advantageously reduces a vibration transmission between the pipe or hose and the mounted component and insulates them with respect to each other. In addition, the rubber profile can protect the pipe or the hose from scratches if the pipe or the hose is displaced in the clamp.

In known clamps, the rubber profile is generally fixed by lips which engage around the edges of the clamp band. Such a clamp is set out, for example, in DE 10 2006 020 407 B3. However, the rubber profile is heavily loaded by the rims or the edges of the clamp band when the pipe or the hose is clamped.

SUMMARY

An object of the disclosure is to provide a clamp which is of the type mentioned in the introduction and which enables good fixing of the rubber profile, wherein a loading of the rubber profile is intended to be as small as possible.

In order to achieve the objective, according to one embodiment, a clamp for securing a tubular or hose-like object is provided, having a clamp band, on the ends of which an outwardly protruding securing member is provided in each case, and having a rubber profile which is arranged on a radial inner face of the clamp band and which at least partially engages around axial edges of the clamp band with a lip. On the radial inner face of the clamp band, at least a first retention geometry is provided and, on a radial outer face of the rubber profile, at least a second retention geometry is provided. The first and the second retention geometries are in engagement with each other, in particular in a radial direction.

Generally, the rubber profile is fixed to the clamp band by the lips which engage around the lateral edge of the clamp band. In contrast, the fixing is carried out according to the disclosure by a positive-locking connection between retention geometries of the radial inner face of the clamp band and the radial outer face of the rubber profile. This has a number of advantages according to different embodiments: on the one hand, the assembly of the rubber profile is simplified. The surrounding lips of the sealing rubber do not have to be adapted to precisely fit the width and thickness of the clamp band. As a result of play provided between the rubber profile and the clamp band, the edges of the clamp band can be introduced in a relatively simple manner between the lips of the rubber profile. Consequently, a sufficiently secure fixing of the rubber profile to the clamp band is also achieved in the pre-assembled state. If a pipe, a hose or a line is mounted in the clamp, the inner face of the clamp band and the outer face of the rubber profile are pressed against each other, whereby the first and the second retention geometry are pressed one inside the other. Consequently, a secure positive-locking connection between the clamp band and rubber profile is ensured.

Depending on the formation of the retention geometries, a fixing of the rubber profile to the clamp band can be achieved in a peripheral direction and/or in an axial direction relative to the receiving space defined by the clamp band. Preferably, the first and the second retention geometries are formed in such a manner that the rubber profile is retained in such a manner that the lips of the rubber profile which engage around the edges are not loaded. The lips act in this instance substantially only as edge protection and can accordingly be constructed with a smaller wall thickness.

For example, the first retention geometry has at least one indentation which is provided in the inner face of the clamp band and the second retention geometry has at least one projection which is provided on the outer face of the rubber profile, wherein the projection engages in the indentation. The indentation and the projection are in this instance in particular orientated radially. In this instance, the indentation can be formed in a relatively simple manner in the clamp band and the projection can during the assembly of the rubber profile on the clamp band be introduced into the indentation in a simple manner so that additional assembly steps are not required.

Alternatively, there may be formed on the inner face of the clamp band at least one inwardly protruding projection and on the outer face of the rubber profile at least one indentation in which the projection engages. Since the clamp band is produced from a more rigid material, the projection on the clamp band is substantially more stable or less susceptible to deformation. The projection in the clamp band may in this instance be constructed, for example, in a point-like manner or extend in particular in the peripheral direction. The indentation can be formed in the rubber profile without significant complexity. As also in the previously described embodiment, a simple assembly is thereby achieved with secure retention.

The projection may in this embodiment be formed by a bead which is embossed in the clamp band. The clamp band is, for example, produced from a flat metal sheet, for example, from a strip material. After cutting the clamp band, the at least one projection can then be formed by embossing a bead. This enables simple production of the clamp band.

The projection and the indentation may have different shapes which in particular complement each other and engage one inside the other. For example, the projection and the indentation may extend on or parallel with a longitudinal center axis of the clamp band. The longitudinal center axis of the clamp band extends axially centrally in a peripheral direction when the clamp band is shaped to form the clamp. As a result of this arrangement of the projection and the indentation, at least a fixing of the rubber profile to the clamp band in an axial direction is achieved.

Preferably, the length and/or the width of the projection substantially corresponds to the length and/or width of the indentation, in which the projection engages. The projection thus engages in a precisely fitting manner in the indentation so that a play-free positive-locking connection in a peripheral direction and/or in an axial direction is achieved. The rubber profile is thereby reliably prevented from being displaced relative to the clamp band in an axial direction and/or in a peripheral direction.

In an alternative embodiment, the indentation is constructed so as to extend in a peripheral direction. This enables very simple production of the rubber profile, for example, in an extrusion process. By clamping a pipe inside the clamp, there is produced a compression of the rubber profile and consequently a substantial closure of the indentation so that the projection(s) is/are retained in a positive-locking manner not only in an axial direction, but also in a peripheral direction and also secure(s) the rubber profile with respect to the clamp band against rotation.

For example, a plurality of indentations which are arranged offset in a peripheral direction and/or in an axial direction are provided. It is thereby possible over the entire periphery to achieve a uniform retention and where applicable to distribute any loads which occur over a larger surface. The indentations can thus be constructed in such a manner that in each case one or more projections can engage therein so that better fixing of the rubber profile can be carried out on the clamp band. More indentations than projections can also be provided, wherein the indentations can where applicable also bring about a degree of thermal insulation. The projections may be individually formed for the desired fixing in the clamp band.

In an embodiment, a plurality of, in particular three indentations which extend in a peripheral direction are provided in the outer face of the rubber profile. In this instance, only a centrally extending indentation cooperates with one or more projections, whilst the other indentations remain free. These indentations enable a degree of axial resilient deformation, with which a degree of relative axial movement of a pipe retained in the clamp can be compensated for without any risk of damage to the rubber profile. The relative movement may, for example, be brought about by temperature-related length changes of the pipe. Any axial stresses which may occur can thus be reduced. At the same time, the rigidity of the rubber profile in a radial direction remains almost unchanged so that the indentations have no significant influence on a vibration behavior.

In an embodiment, a depth of the recess is between 10 and 25%, in particular between 15 and 20% of a radial thickness of the rubber profile. The radial thickness of the rubber profile is in this instance measured from the outer face facing the clamp band to an inner face of the rubber profile directed toward the receiving space. When the clamp is clamped, there is generally a thickness reduction so that the indentations at least partially close with the clamp tensioned.

In an embodiment, a plurality of projections which are offset in a peripheral direction and/or in an axial direction are provided. These projections may engage in different indentations or in a common indentation. A better fixing can thereby be achieved since the retention forces are distributed over a plurality of projections. If the projections and the indentations are distributed in a peripheral direction, retention forces can be absorbed so as to be distributed in a uniform manner over the peripheral region.

The rubber profile may additionally have recesses which extend in the region of the lips in a peripheral direction. Direct contact between the edges of the clamp band and the rubber profile is thereby prevented. This enables rapid and simple assembly of the clamp by inserting the clamp band between the lips of the rubber profile since the often relatively sharp edges of the clamp band in this instance do not come into contact with the rubber profile. Damage to the rubber profile when the clamp band is inserted is thus reliably prevented. During subsequent clamping of the clamp, the edges of the clamp band further cannot press into the rubber profile so that the rubber profile in the region of the edges of the clamp band is protected from damage by the clamp band. Furthermore, there is produced a more uniform distribution of a load and a pressing pressure.

In an embodiment, a depth of the recess is between 10 and 25%, in particular between 15 and 20% of a radial thickness of the rubber profile. In particular, the recesses and the indentations have the same cross-section. The recesses are then substantially closed by the compression of the rubber profile when the clamp is closed and thus enable a uniform load distribution.

In this instance, an air gap may be formed between the edges of the clamp band and the rubber profile. The lips of the rubber profile thereby engage around the edges of the clamp band with relatively large play. Damage to the rubber profile by the clamp band is thereby virtually excluded.

In this instance, ends of the lips which are directed toward each other may be constructed with a conically tapering cross-section. The lips must absorb almost no forces, but instead act substantially only as edge protection. Accordingly, they can be constructed with relatively thin walls, which leads to material savings.

In one embodiment, at least outer edges of the rubber profile are rounded. In particular with small clamp diameters, a stress in the region of the outer edges is thereby reduced. Consequently, a longer service-life is achieved.

The rubber profile can be produced with an extrusion process, that is to say, as an endless material, and be cut to the required length. A continuous indentation or a continuous projection in the peripheral direction of the clamp band or in the longitudinal direction of the rubber profile can already be formed during the extrusion so that for the production of the indentation or the projection no additional operating steps are required. For example, the rubber profile can be produced with a multi-component extrusion process so that different regions of the rubber profile are produced from different materials. A load-compliant material adaptation of the rubber profile or an adaptation to a desired function is thereby possible. For example, the retention geometry may be produced from a rigid material and the contact face may be produced from a soft material, which enables an adaptation to the object which is intended to be retained or which provides a higher level of friction between the clamp and the object so that it is securely retained. The material may be, for example, commercially available plastics material or a rubber material, ethylene propylene diene rubber (EPDM), acrylonitrile-butadiene rubber or nitrile rubber (NBR), silicone, FKM (fluorocarbon rubber), a thermoplastic elastomer material, PVC (polyvinyl chloride), SBR (styrene-butadiene rubber) or a combination of these materials. Depending on the material used, the rubber profile may bring about an electrical insulation. This applies, for example, to EPDM with specific filling materials, which can be used for securing aluminum pipes.

BRIEF DESCRIPTION OF THE FIGURES

Other features, details and advantages of the disclosure will be appreciated from the wording of the claims and from the following description of embodiments with reference to the drawings, in which:

DETAILED DESCRIPTION

Figure 1:
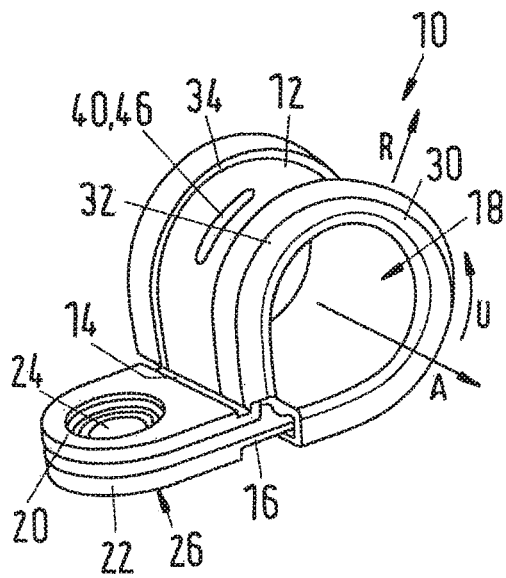
FIG. 1 is a perspective view of a clamp.

FIG. 1 shows a clamp 10 for securing a tubular or hose-like object. The clamp 10 has a clamp band 12 at the ends 14, 16 of which a securing member 20, 22 which protrudes radially outward with respect to a receiving space 18 formed by the clamp 10 is provided. The securing members 20, 22 each have a recess 24, 26 for a securing element, for example, a screw.

In the embodiment shown here, the securing members 20, 22 are arranged parallel with each other so that there is required in order to secure the object only one securing element which extends through both securing members 20, 22 and tensions them with respect to each other and at the same time retains the clamp 10 on a mounted component. Alternatively, the securing members 20, 22 may also be arranged to be spaced apart from each other so that they can each be fixed separately from each other to a mounted component. In this instance, the receiving space 18 is not completely surrounded by the clamp band 12.

The clamp band 12 may be produced from metal, for example, from a sheet metal strip, or another tension-resistant material.

At the radially inner face 28 of the clamp band 12 with respect to the receiving space 18, a rubber profile 30 is provided. The rubber profile 30 is intended to insulate the clamp band 12 with respect to the tubular or hose-like object and prevent or reduce a transmission of vibrations.

Furthermore, the rubber profile 30 protects the object from scratching by the clamping band 12, for example, when the object after being placed in the clamp 10 is positioned, that is to say, orientated relative to the clamp 10.

Figure 2:
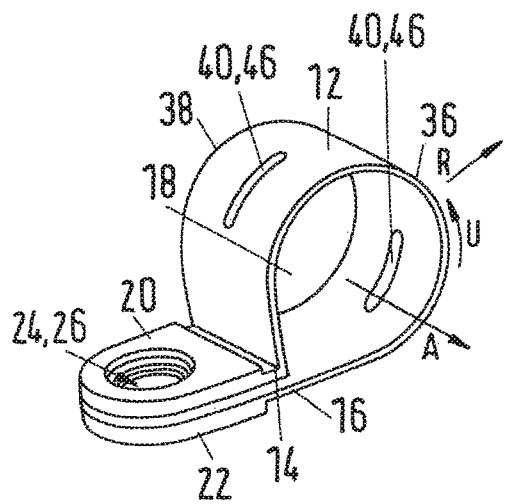
FIG. 2 is a perspective view of the clamp band of the clamp from FIG. 1.

The rubber profile 30 has at the edges a respective lip 32, 34 which engage around the edges 36, 38 of the clamp band 12 (see FIGS. 2 and 3), wherein the lips 32, 34, as explained below, produce only a rough prepositioning of the rubber profile 30 on the clamp band 12. Since the lips 32, 34 are both in an axial direction A and in a radial direction R with respect to the receiving space 18 spaced apart from the edges 36, 38 of the clamp band 12, however, the lips 32, 34 are not mechanically loaded by the edges 36, 38.

The precise positioning of the rubber profile 30 on the clamp band 12 is carried out in this embodiment by two first retention geometries 40 which are provided on the inner face 28 of the clamp band 12 and complementary second retention geometries 44 which are provided on the radial outer face 42 of the rubber profile 30 and which engage in each other in a radial direction R. The first retention geometries 40 each have a radially inwardly protruding projection 46 and the second retention geometries 44 each have an indentation 48.

The projections 46 are in each case formed by beads which extend in a peripheral direction U and which are introduced by way of embossing in the clamp band 12. The projections 46 extend in each case partially in the peripheral direction U.

The indentations 48 each also extend in the direction of a longitudinal center axis of the clamp band 12, that is to say, in the peripheral direction U, and are constructed in such a manner that the projections 46 can protrude into them. There are provided in the rubber profile 30 further indentations 48a, 48b which extend in the longitudinal direction or in the peripheral direction U, wherein no projections 46 protrude in these indentations 48a, 48b. In corners 50, 52 of the rubber profile 30, recesses 54, 56 which extend in the peripheral direction U are further provided.

The rubber profile 30 is, for example, produced in an extrusion process and cut to the required length.

Figure 3:
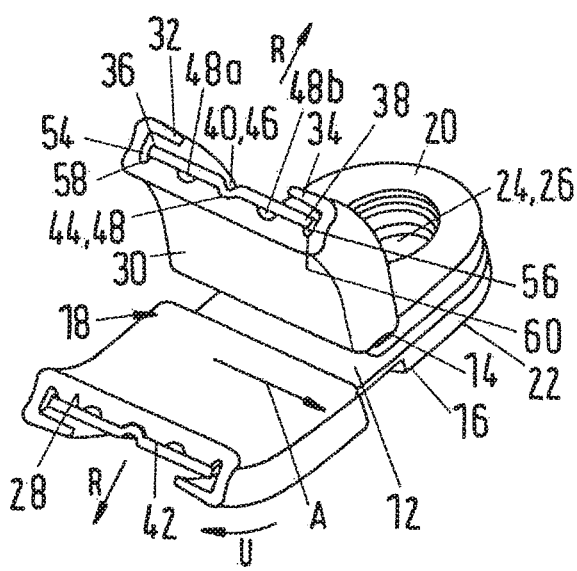
FIG. 3 is a plan view of the clamp from FIG. 1.
Figure 4:
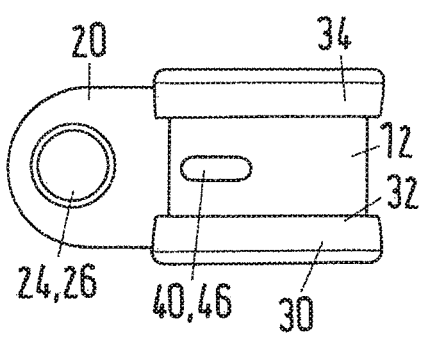
FIG. 4 is a partially sectioned view through the clamp from FIG. 1.
Figure 5:
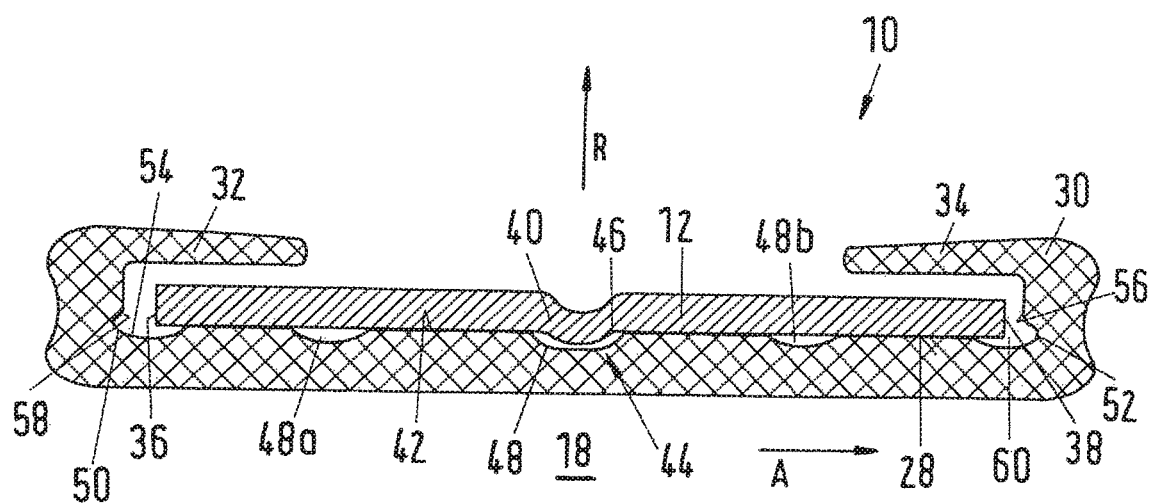
FIG. 5 is a sectioned view through the clamp band and the rubber profile of the clamp from FIG. 1.

As can be seen in particular in FIGS. 3 and 5, the spacing of the lips 32, 34 or the corners 50, 52 is greater than the spacing of the edges 36, 38, that is to say, the width of the clamp band 12. The rubber profile 30 thereby does not abut the edges 36, 38 of the clamp band 12 in an axial direction A. As a result of the recesses 54, 56, the rubber profile 30 is additionally spaced apart in a radial direction R from the edges 36, 38 of the clamp band 12. That is to say, the edges 36, 38 of the clamp band 12 have no contact with the rubber profile 30 and there is therefore no loading of the edges. In particular, the spacing between the edge 36 and the lip 32 or the spacing between the edge 38 and the lip 34 is of the same size so that the clamp band is arranged substantially centrally or symmetrically between the lips. The position of the rubber profile 30 relative to the clamp band 12 is dependent on the position of the first and second retention geometries 40, 44.

In order to secure a tubular or hose-like object, it is introduced through the receiving space 18 and the clamp 10 is secured using a securing element to a mounted component, wherein the securing members 20, 22 are tensioned with respect to each other by the securing element. The clamp 10 thereby moves, extending in the peripheral direction U, into abutment with the object so that the object is held in a clamping manner in the clamp 10.

The outer face 42 of the rubber profile 30 is thereby pressed against the inner face 28 of the clamp band 12, whereby the first retention geometries 40 and the second retention geometries 44, that is to say, the projections 46 and the indentations 48, engage one in the other in a radial direction and form a positive-locking connection in an axial direction. As a result of the increasing pressure when the clamp band 12 is tensioned, the projections 46 are pressed into the indentations 48 so that the positive-locking connection cannot be released.

As can be seen in FIGS. 3 and 5, the outer face 42 of the rubber profile 30 abuts with the exception of the indentations 48a, 48b and the recesses 54, 56 in a planar manner the inner face 28 of the clamp band. As a result of the spacing between the edges 36, 38 and the recesses 54, 56, an air gap 58, 60 is formed between the edges 36, 38 and the rubber profile in an axial direction so that the edges 36, 38 cannot cut into the rubber profile 30 and the rubber profile 30 is reliably protected from damage by the edges 36, 38 of the clamp band. The indentations 48a, 48b additionally bring about a more uniform distribution of stresses, in particular the pressure stresses which occur, within the rubber profile 20.

Since the rubber profile 30 may have in the preassembled state a relatively large play with respect to the clamp band 12, the geometry of the projections and indentations is constructed in such a manner that, when the clamp is tightened, a centering of the rubber profile 30 on the clamp band 12 is carried out.

As already explained, the positioning and securing of the rubber profile 30 on the clamp band 12 is thereby carried out by the first and second retention geometries 40, 44 which engage in each other in a radial direction R. In the embodiment shown here, fixing is carried out in an axial direction, wherein the width of the indentations 44, 48 substantially corresponds to the width of the projections 40, 46 so that play-free fixing is carried out in an axial direction. As a result of a corresponding positioning and formation of the first and second retention geometries 40, 44, a fixing in the peripheral direction U is additionally possible, for example, by a positive-locking connection between the first and the second retention geometries 40, 44 also being produced in a peripheral direction U.

The disclosure is not limited to one of the above-described embodiments, but instead can be modified in many ways.

In particular, the first and second retention geometries 40, 44 which engage one in the other may be arranged so as to be distributed in a peripheral direction and/or in an axial direction in order to improve the fixing of the rubber profile 30 to the clamp band 12. The projections 46 may also be provided on the second retention geometry 44, that is to say, on the rubber profile 30, and the indentations 48 may be provided on the first retention geometry 40, that is to say, on the clamp band 12. Furthermore, the first and the second retention geometries 40, 44 may have both projections 46 and indentations 48. The first and the second retention geometries 40, 44 only have to be constructed in such a manner that they engage in each other in a radial direction R and can produce a positive-locking connection in an axial direction A and/or in a peripheral direction U between the rubber profile 30 and the clamp band 12.

The rubber profile 30 may, for example, be produced using an extrusion process. In particular, the rubber profile 30 may also comprise different materials, whereby a load-compliant and/or functionally compliant adaptation of the properties of the rubber profile 30 can be carried out. For example, the rubber profile 30 may comprise commercially available plastics materials or rubber materials, ethylene propylene diene rubber (EPDM), acrylonitrile-butadiene rubber or nitrile rubber (NBR), silicone or combinations thereof.

All of the features and advantages derived from the claims, the description and the drawings, including structural details, spatial arrangements and method steps, may be significant to the invention both individually per se and in extremely different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

| List of reference numerals | |
|---|---|
| 10 | Clamp |
| 12 | Clamp band |
| 14 | First end of the clamp band |
| 16 | Second end of the clamp band |
| 18 | Receiving space |
| 20 | Securing member |
| 22 | Securing member |
| 24 | Recess |
| 26 | Recess |

-continued

| List of reference numerals | |
|---|---|
| 28 | Radial inner face of the clamp band |
| 30 | Rubber profile |
| 32 | Lip of the rubber profile |
| 34 | Lip of the rubber profile |
| 36 | Edge of the clamp band |
| 38 | Edge of the clamp band |
| 40 | First retention geometry |
| 42 | Radial outer face of the rubber profile |
| 44 | Second retention geometry |
| 46 | Projection |
| 48 | Indentation |
| 48a | Indentation |
| 48b | Indentation |
| 50 | Corner |
| 52 | Corner |
| 54 | Recess |
| 56 | Recess |
| 58 | Air gap |
| 60 | Air gap |
| A | Axial direction |
| R | Radial direction |
| U | Peripheral direction |

The invention claimed is:

1. A clamp for securing a tubular or hose-like object, having a clamp band, the clamp band being a flat metal sheet, the clamp band having ends, wherein on the ends of the clamp band an outwardly protruding securing member is provided in each case, and the clamp having a rubber profile which is arranged on a radial inner face of the clamp band and which at least partially engages around edges of the clamp band with a lip, wherein on the radial inner face of the clamp band at least a first retention geometry is provided and on a radial outer face of the rubber profile, at least a second retention geometry is provided, wherein the first and the second retention geometries are in engagement with each other in a radial direction (R), wherein the first retention geometry is at least one radially inwardly protruding projection which is provided on the radial inner face of the clamp band and the second retention geometry is at least one radial indentation which is provided in the radial outer face of the rubber profile, the at least one radially inwardly protruding projection engages in the at least one radial indentation, and wherein the at least one radially inwardly protruding projection is a plurality of radially inwardly protruding projections which are offset in a peripheral direction (U), wherein the radially inwardly protruding projections are formed by a bead which is embossed in the clamp band.

2. The clamp as claimed in claim 1, wherein the radially inwardly protruding projections, the at least one radial indentation, or both the radially inwardly protruding projections and the at least one radial indentation extend on or are parallel with a longitudinal center axis of the clamp band.

3. The clamp as claimed in claim 1, wherein the at least one radial indentation is constructed so as to extend in a peripheral direction.

4. The clamp as claimed in claim 1, wherein the at least one radial indentation is a plurality of radial indentations which are arranged offset in the peripheral direction (U).

5. The clamp as claimed in claim 1, wherein the rubber profile has in a region of the lips continuous recesses which extend in the peripheral direction (U).

6. The clamp as claimed in claim 1, wherein in an axial direction between the edges of the clamp band and the rubber profile an air gap is formed.

7. The clamp as claimed in claim 1, wherein the rubber profile is produced via a multi-component extrusion process.

* * * * *